United States Patent [19]
Pruvot et al.

[11] Patent Number: 4,722,123
[45] Date of Patent: Feb. 2, 1988

[54] DRIVING SYSTEM FOR AUTOMATIC LATHES

[75] Inventors: Francois C. Pruvot, La Conversion; Jean-Claude Simonin, Moutier; Jean-Marc Favre, Nidau, all of Switzerland

[73] Assignee: Tornos-Bechler SA, Fabrique de Machines Moutier, Moutier, Switzerland

[21] Appl. No.: 897,275

[22] Filed: Aug. 18, 1986

[30] Foreign Application Priority Data

Aug. 28, 1985 [CH] Switzerland .................. 3691/85

[51] Int. Cl.$^4$ ............................................. B23B 19/02
[52] U.S. Cl. ........................................ 29/27 C; 29/64; 82/29 B; 408/128
[58] Field of Search ............... 408/63, 124, 128, 10; 409/165, 166; 82/28 R, 28 A, 28 B, 29 C, 29 A, 29 B, 30; 29/27 C, 37 R, 38 A, 38 B, 64

[56] References Cited

U.S. PATENT DOCUMENTS

| | | | |
|---|---|---|---|
| 2,036,821 | 4/1936 | Munson | 82/2 |
| 2,659,020 | 10/1953 | Brown | 82/29.1 |
| 3,710,466 | 1/1973 | Williamson et al. | 409/165 |
| 3,874,809 | 4/1975 | Hahn et al. | 82/29 R |
| 4,476,752 | 10/1984 | Hessbruggen | 82/28 R |

FOREIGN PATENT DOCUMENTS

| | | |
|---|---|---|
| 97346 | 1/1984 | European Pat. Off. |
| 935641 | 12/1955 | Fed. Rep. of Germany |
| 844882 | 8/1939 | France |
| 1217326 | 12/1970 | United Kingdom |

Primary Examiner—Z. R. Bilinsky
Attorney, Agent, or Firm—Parkhurst & Oliff

[57] ABSTRACT

An electric motor can drive a workpiece and a tool simultaneously at speeds in a ratio adjustable at will. The workpiece is driven via two pulleys and a belt, while the tool is driven via further pulleys and a belt from a hydraulic circuit comprising a pump coupled to the electric motor and a hydraulic motor. The pump is preferably of the variable-capacity type so that its flow can be modified independently of the speed of the electric motor.

7 Claims, 2 Drawing Figures

DRIVING SYSTEM FOR AUTOMATIC LATHES

BACKGROUND AND SUMMARY OF THE INVENTION

This invention relates to machine tools, and more particularly to a driving system for an automatic lathe having a work spindle and at least one rotary toolholder, the axis of which is parallel to or the same as that of the spindle, the system being intended to drive a rotary tool for carrying to end-machining operations on the end face of a workpiece.

End-machining of a workpiece, e.g., one formed at the end of a bar, in the headstock of an automatic lathe is currently carried out according to one of the following two methods, both of which present drawbacks:

In the first method, the work spindle is stopped when end-machining is to be carried out, and the tool carriage is moved axially while the tool is rotated. The drawback of this method is the loss of machining time due not only to the time necessary for stopping the workpiece and then restarting it, as the case may be, but also to the fact that it is not possible to carry out any turning operation on the workpiece during the end-machining operation.

In the second method, the end-machining tool and the workpiece are both rotated, each by its own motor, the actual machining speed equalling the sum of or the difference between the speeds of rotation of the workpiece and the tool. With this method, the above-mentioned drawbacks are avoided. However, the driving power necessary for the motor rotating the tool is greater than with the first method, for the tool must be supplied with a certain machining torque which depends on its size, on the metal of which the workpiece is made, and on the desired operation. If this torque must be supplied at a speed close to the speed of rotation of the workpiece, which can reach several thousand rpm, the power necessary for driving the tool is increased as compared with the power necessary when the workpiece is stationary, and the ratio of the powers is the same as that of the speeds. Furthermore, the power of the driving motor must also be increased in order to keep the tool from being driven at the speed of rotation of the workpiece during machining.

In automatic lathes of the profiling type, it has been proposed to establish a mechanical connection between the means for driving the workpiece and the means for driving the tool in order to be able to have both elements driven by one motor. This solution is complicated and expensive and requires a great deal of preliminary work before each operation.

Hydraulic circuits comprising pumps and hydraulic motors have already been used for controlling machine tools. Thus, U.S. Pat. No. 2,036,821 describes a hydraulic system, driven by an electric motor and synchronized with the means for rotating the workpiece, for moving a tool carriage in a lathe. U.K. Pat. No. 1,217,326 describes the driving of hydraulic motors by means of a circuit in which the pressure and rate of flow are controlled by a variable-capacity pump which is in turn driven by a motor.

However, until now there has never been a really satisfactory solution to the problem of driving an end-machining tool in an automatic lathe machining workpieces at the end of a bar when the lathe is numerically controlled.

It is therefore an object of this invention to provide an improved driving system which meets this need.

To this end, in the driving system according to the present invention, the improvement comprises an electric motor simultaneously driving the spindle and a pump, the pump being incorporroated in a hydraulic circuit which in turn comprises a hydraulic motor driving the toolholder.

BRIEF DESCRIPTION OF THE DRAWINGS

A preferred embodiment of the invention will now be described in detail with reference to the accompanying drawings, in which.

DETAILED DESCRIPTION OF THE PREFERRED EMBODIMENTS

Figure 1:
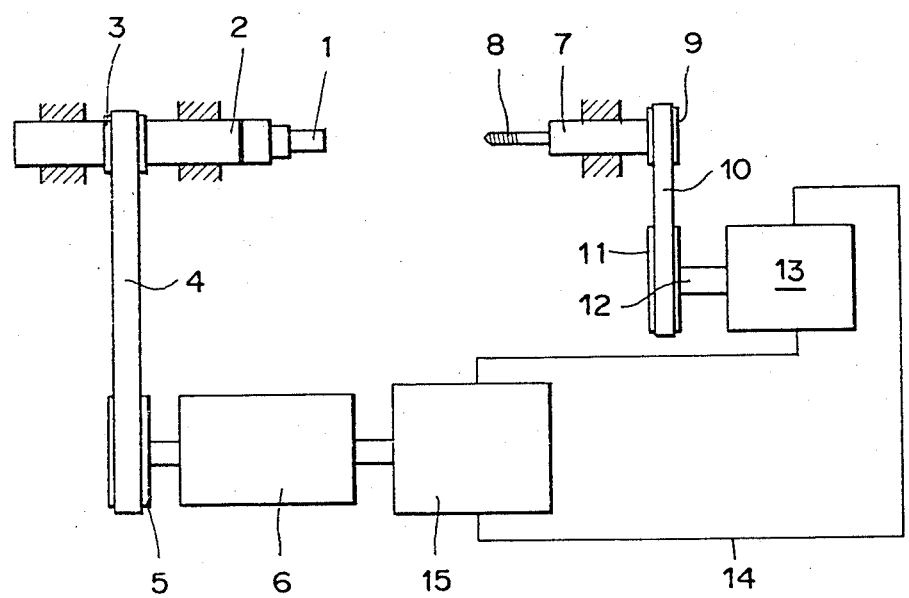
FIG. 1 is a simplified diagrammatic view of the driving system.

FIG. 1 shows certain components of an automatic lathe. A workpiece 1 to be machined is coaxially fixed by a workpiece holder (not shown) to a spindle 2 rotating about a fixed axis. Workpiece 1 may be an individually chucked part or, on the contrary, the end of a bar from which the workpieces, once machined, are cut off one after the other. Spindle 2 is coupled to a pulley 3 connected by a belt 4 to a similar pulley 5 coupled to the shaft of an electric drive motor 6. Motor 6 may, for example, be a DC motor equipped with a driving and speed-regulating device designed to rotate spindle 2 at the desired speed regardless of the resistance torque opposed to its rotation.

The lathe described may naturally comprise a plurality of toolholders, either rotary toolholders or fixed toolholders capable of being indexed into cutting position in a predetermined sequence. Thus, a toolholder 7 provided with a bit 8 is disposed facing workpiece 1, coaxially therewith. It will be understood that the tool 8 may equally well be some other type of tool than a drill-bit. Toolholder 7 is coupled to a pulley 9 driven over a belt 10 by a pulley 11 keyed on the shaft 12 of a hydraulic motor 13. A hydraulic driving circuit, designated as a whole by reference numeral 14 in FIG. 1, supplies hydraulic motor 13 with pressurized fluid. This fluid is supplied in a closed circuit at the required pressure and rate of flow by a pump 15 connected to motor 6.

Figure 2:
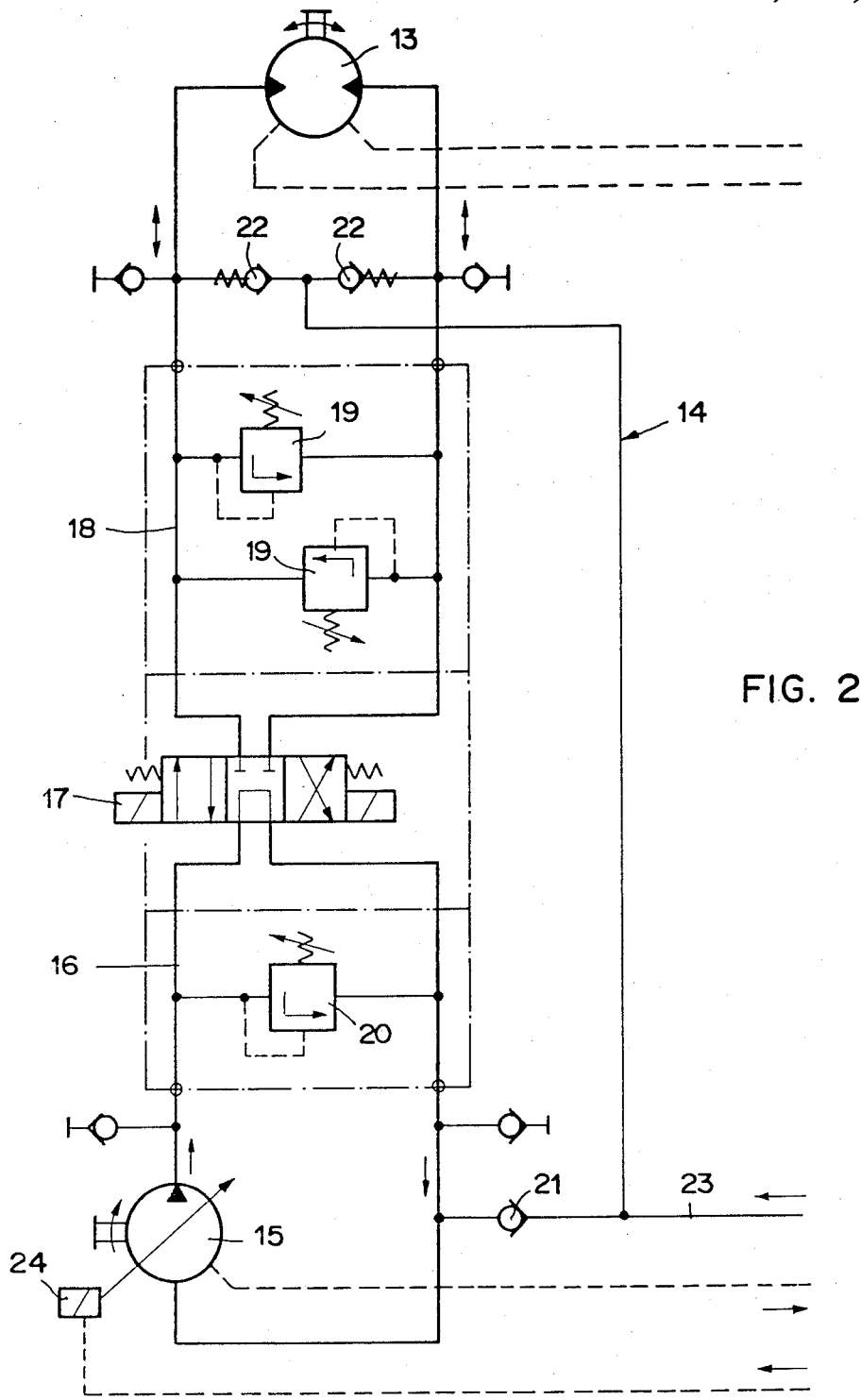
FIG. 2 is a diagrammatic view of the hydraulic circuit included in the driving system.

FIG. 2 shows in greater detail how hydraulic circuit 14 is made up. Pump 15 is preferably a variable-capacity pump. Its shaft, coupled directly or via gearing to the shaft of motor 6, drives rotatingly, in accordance with a design known per se, via one or more axial displacement pistons, a barrel provided with sockets in which the pistons slide. The barrel, mounted on a ball-and-socket pivot shaft, is held in an inclined position relative to the primary shaft of the pump, and the angle of inclination may be modified by means of a control 24 to vary the flow of the pump without changing the speed of the motor. Inasmuch as the motor always runs in the same direcion, the motor fluid always runs through a pump circuit 16 in the same direction and, at a variable rate of flow depending on the position of the pump barrel, supplies a distributor 17 capable of feeding a circuit 18 of hydraulic motor 13 in either direction so that the direction of rotation of motor 13 can be reversed, if need be. Motor 13 may also take the form of an apparatus of the same type as pump 15 wherein the inclination of the barrel relative to the axis of the motor shaft might be either fixed or adjustable.

The two circuits 16 and 18 comprise the necessary pressure-control valves 19 and 20, as well as valves 21 or 22 ensuring security of operation. Circuits 16 and 18 are connected to a feed source 23 which not only compensates for fluid leakage during operation but can also operate motor 13 independently of pump 15. This latter option may be put to use when an end-machining operation on workpiece 1 has to be carried out simultaneously with a transverse turning operation.

Distributor 17 and the controls of pump 15 and feed 23 are connected to an electronic circuit acted upon equally by detectors of the speeds of rotation of toolholder 7 and workpiece 1 and by control means. By means of the latter, commands can be given to the driving system concerning the speed of tool 8 or the differences in speed to be maintained between workpiece 1 and tool 8.

These data may be incorporated in a program of numerical control of the machining operations. They further include commands relating to the speed of motor 6, as well as to the speed of advance of the workpiece and the indexing of the tools, and commands relating to the flow of pump 15 and to the control of distributor 17 by means of which motor 13 may be stopped or caused to run in the opposite direction.

Generally speaking, the electronic circuitry will comprise the means necessary for automatically controlling the operation of the pump so as to keep the motor running at a constant speed.

The system described presents numerous advantages. Thus, the hydraulic circuit between pump 15 and motor 13 is easy to produce, using modular components. It may be conceived as a function of the various types of machines within one family, on the same model, or by making only insignificant changes from one type to another. Owing to the variable-capacity hydraulic pump 15, it is possible to obtain the exact speed desired for the end-machining tool or tools, taking the speed of the spindle into account. The variation in speed is, in fact, continuous with the variation of the angle between the barrel and the drive shaft.

The power consumed by the hydraulic circuit is necessarily subtracted from that supplied by the motor for driving the workpiece. In other words, the driving system forms a closed loop under all circumstances, so that in no case is the motor liable to operate as a generator. Indeed, as it is the only part which consumes power, its consumption cannot be negative.

Fixed-capacity hydraulic motor 13 might be replaced by a variable-capacity motor, which would increase the range of possible speeds for the end-machining tool or tools. Moreover, the circuit fed by pump 15 might run several motors 13, thus driving several rotary tools.

In the event that a machining operation by means of a rotary tool must be carried out with the workpiece stopped, motor 13 is fed directly from source 23, and the control device may contain the data necessary for adjusting the pressure and the rate of flow of the fluid actuating motor 13 as may be desired. The speed of motor 13 may likewise be modified by adjusting the inclination of the rotary barrel containing the plunger pistons relative to the primary shaft if a variable-capacity motor is involved.

Finally, the lathe is equipped with a single drive motor having the maximum power required. From the point of view of space-spacing and cost, this is a more advantageous solution than the prior art solutions in which the workpiece and the end-machining tool are driven by separate motors.

What is claimed is:

1. A driving system for an automatic lathe having a workspindle with a workpiece having an end face held in said workspindle, said lathe having at least one rotary toolholder holding a tool, said system comprising:
   means for rotatively supporting said workspindle and said toolholder, each of said workspindle and said toolholder being movable in rotation about an axis, the axis of the toolholder being parallel to or the same as the axis of the workspindle; and
   means for driving both said workspindle and said toolholder in rotation at different speeds and for commanding a speed of advance of said workpiece with respect to said tool, thus carrying out end-machining operations on said end face,
   wherein said driving means comprises
      an electric motor,
      a pump having a shaft,
      a hydraulic motor having a shaft,
      circuit means for supplying said hydraulic motor with pressurized fluid supplied by said pump,
      means for connecting said electric motor to said workspindle and to said shaft of said pump, and
      means for connecting said shaft of said hydraulic motor to said toolholder.

2. The driving system of claim 1, wherein said pump is a multiple-piston, variable-capacity pump.

3. The driving system of claim 2, wherein said hydraulic motor is a multiple-piston, variable-capacity hydraulic motor.

4. The driving system of claim 2, further comprising electronic capacity-adjusting means for said pump for maintaining a predetermined difference in speed between the toolholder and the work spindle of the lathe.

5. The driving system of claim 1, further comprising fluid-supply means connected to said hydraulic circuit for driving said hydraulic motor when said electric motor is at a standstill.

6. The driving system of claim 5, further comprising servo means acting upon said fluid-supply means for keeping the speed of said hydraulic motor constant.

7. The driving system of claim 1, further comprising a belt-and-pulley drive connecting said hydraulic motor to the toolholder of the lathe, said electric motor being directly coupled to said pump.

* * * * *